Dec. 22, 1964  C. A. HUFFMAN  3,162,847
WIND VELOCITY ALARM
Filed Dec. 20, 1960
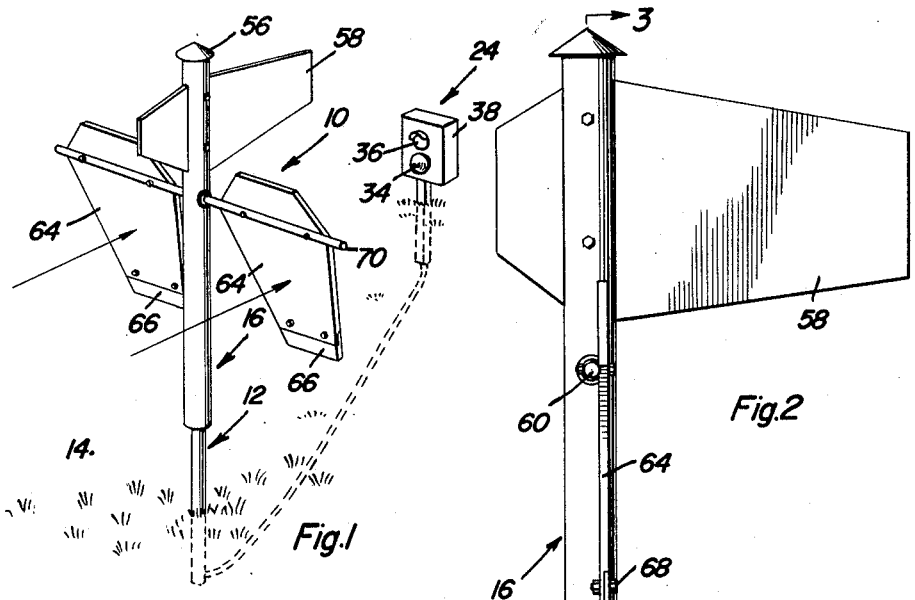
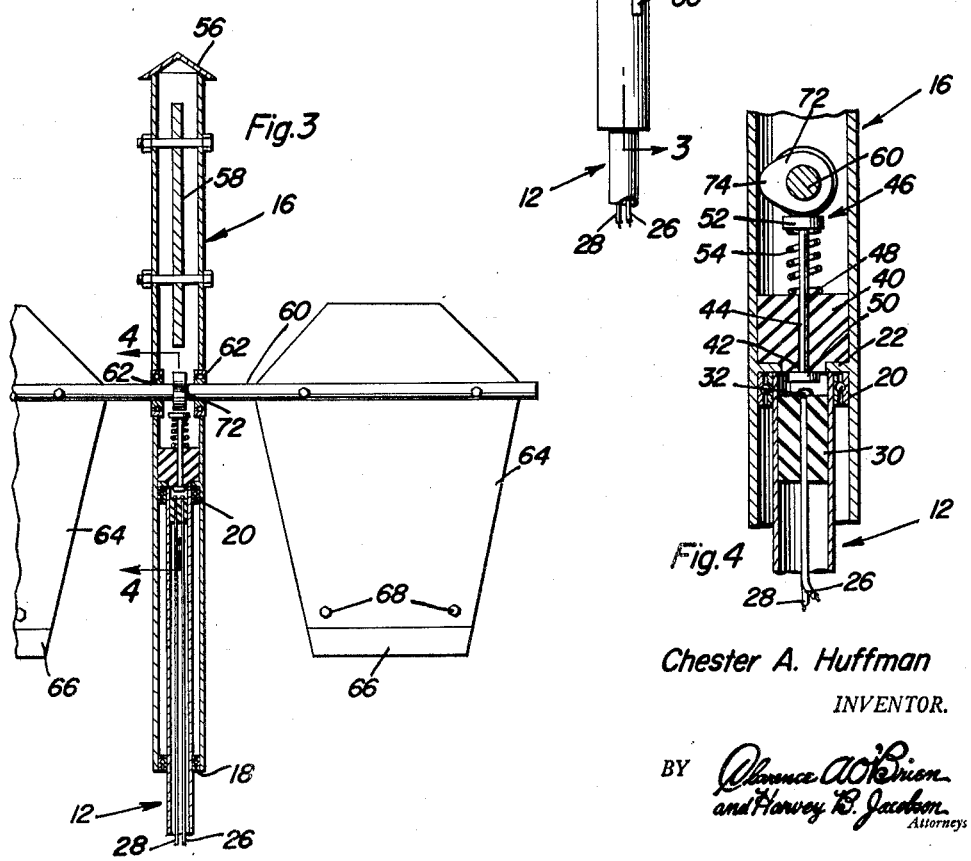
Chester A. Huffman
INVENTOR.

United States Patent Office 3,162,847
Patented Dec. 22, 1964

3,162,847
WIND VELOCITY ALARM
Chester A. Huffman, 2825 S. Main St., Elkhart, Ind.
Filed Dec. 20, 1960, Ser. No. 77,218
3 Claims. (Cl. 340—241)

This invention relates to a novel and useful wind velocity alarm and more particularly to a wind velocity alarm adapted to provide both visual and audible indications of wind exceeding a predetermined amount.

There are many instances when it is extermely desirable to know the approximate wind velocity or when the wind has exceeded a predetermined velocity. As an example small airfields are usually provided with a wind sock for visually indicating the wind direction and the approximate velocity of the wind. When a wind sock is used, the wind velocity may be approximated by observing the inclination of the free end of the wind sock. However, many small airfields providing service for light planes are not equipped with radio communications, runway lights and other navigational aids for aiding light plane pilots. It is of course very difficult to observe the wind direction and approximate velocity indicated by a wind sock at nighttime.

Accordingly, it is the main object of this invention to provide a wind velocity alarm which will not only provide a means whereby the wind direction and approximate velocity may be ascertained during daylight hours and also during the nght. With a navigational aid of this type light planes not equipped with radios may be operated with greater safety at nighttime from small airfields not provided with other illuminated navigational aids.

A further object of this invention is to provide a wind velocity alarm which will also be capable of effecting an audible signal when the wind has exceeded a predetermined velocity.

Still another object of this invention is to provide a wind velocity alarm which may be readily adjusted to render an alarm at various wind velocities.

A still further object of this invention is to provide a wind velocity alarm in accordance with the preceding objects which will conform to conventional forms of manufacture, be of simple construction and completely automatic in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the wind velocity alarm of the instant invention;

FIGURE 2 is a side elevational view of a portion of the wind velocity alarm;

FIGURE 3 is a vertical sectional view taken substantially upon the plane indicated by the section line 3—3 of FIGURE 2; and FIGURE 4 is a vertical sectional view on somewhat of an enlarged scale taken substantially upon the plane indicated by the section line 4—4 of FIGURE 3.

Referring now more specifically to the drawings the numeral 10 generally designates the wind velocity alarm of the instant invention. The alarm 10 includes a tubular standard 12 whose lower end is adapted to be embedded in the ground 14. The lower end of the sleeve generally designated by the reference numeral 16 is telescoped over the upper end of the standard 12 and is journalled for rotation about the longitudinal axis of the standard 12 by means of bearings 18 and 20. The bearing 18 is carried by the lower end of the sleeve 16 and the bearing 20 is carried by the upper end of the standard 12. The sleeve 16 includes an inwardly directed annular shoulder 22 which abuts the upper surface of the bearing 20 and supports the sleeve 16 on the standard 12.

An indicator assembly generally referred to by the reference numeral 24 includes an electrical circuit of which conductors 26 and 28 comprise a part. The upper end of the standard 12 has a plug 30 disposed therein constructed of any suitable insulating material. One pair of ends of the conductors 26 and 28 are disposed through the plug 30 and terminate in horizontally spaced terminals 32. The other pair of ends of the conductors 26 and 28 are operatively connected to the bell 34 and light 36 in the housing 38 of the indicator assembly 24. A plug 40 is disposed in the lower end of the sleeve 16 and abuts against the upper surface of the shoulder 22. The plug 40 includes a diametrically reduced portion 42 which projects through the annular shoulder 22. A bore 44 is formed axially through the plug 40 and an elongated actuator generally referred to by the reference numeral 46 has its shank portion 48 slidably received in the bore 44. The lower end of the shank 48 is provided with a diametrically enlarged head portion 50 which is constructed of a material capable of conducting electricity and the upper end of the shank 48 is provided with a diametrically enlarged head portion 52. A compression spring 54 is disposed between the upper surface of the plug 40 and the under surface of the head 52 to resiliently urge the actuator 46 upwardly away from the terminals 32.

The upper end of the sleeve 16 is provided with a closure cap 56 and also with a vane 58 for orientating the sleeve 16 relative to the wind direction in a manner which will be obvious from the drawings.

A shaft 60 is journalled through the portion of the sleeve 16 disposed above the upper end of the standard 12 by means of bearings 62 and has secured to the remote ends thereof a pair of vanes 64. The outermost free ends of the vanes 64 have a pair of weights 66 removably secured thereto by means of fasteners 68. The weights 66 normally urge the vanes 64 to a vertically disposed position by means of gravity and it will be noted that wind impinging on the vanes 64 will effect rotation of the shaft 60 to which the vanes are secured, see FIGURE 1.

The shaft 60 includes a cam lobe 72 disposed within the sleeve 16 whose toe portion 74 is engageable with the diametrically enlarged head portion 52 of the actuator 46 upon rotation of the shaft 60 to depress the actuator 46 against the tension of the spring 54 in order to lower the diametrically enlarged head portion 50 into contact with the terminals 32 in order to close the electrical circuit formed by the conductors 26 and 28. Thus, upon rotation of the shaft 60 by means of wind impinging on the vanes 64, the actuator 48 is depressed into engagement with the terminals 32 in order that the electrical circuit to the bell 34 and the light 36 may be closed. Thus, upon rotation of the shaft 60 both the bell 34 and the light 36 will be actuated. It is of course to be appreciated that the electrical circuit connected to the light 36 and bell 34 includes a suitable source of electricity. In addition, the actuator 46 could be modified in order to render several different indications each corresponding to a predetermined wind velocity.

Because of the extreme simplicity of construction of the alarm 10, it will be relatively inexpensive to manufacture and because of the manner in which it is constructed, all of the operating parts thereof are completely housed within the confines of the sleeve 16. Accordingly, it may be appreciated that the alarm 10 will be capable of rendering relatively trouble free operation for extended periods of time with a minimum amount of maintenance being required.

Further, although the wind velocity alarm 10 has been illustrated and described herein as being used as a navigational aid, it is to be noted that the lower end of the standard 12 could be provided with a mounting bracket suitable for adapting the standard for securement to a roof or other part of a building and that the alarm could be used to warn occupants of homes, hospitals, schools, factories and other buildings of impending danger of excessively strong winds.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wind velocity alarm comprising an upright standard, an elongated sleeve telescoped over the upper end of said standard and journalled on the latter for rotation about its longitudinal axis, said sleeve having a closed upper end, a horizontally disposed shaft extending transversely through and journalled in said sleeve, first wind responsive means carried by said sleeve and operative for orientating said sleeve relative to the direction of the wind and with said shaft extending transversely of the latter, second wind responsive means carried by said shaft outwardly of said sleeve and having at least one surface on which wind may impinge to effect rotation of said shaft, indicator means for indicating movement of said shaft, and an actuator connected to said shaft and disposed inwardly of said sleeve and operative in response to rotation of said shaft for effecting actuation of said indicator means, said second wind responsive means including at least one vane carried by an end of said shaft projecting outwardly of said sleeve, said vane extending along and generally transversely of said shaft, and means operatively connected to said shaft yieldingly urging the latter to a position of rotation with said vane substantially vertically disposed.

2. The combination of claim 1, wherein said indicating means includes an electrical actuating circuit having two spaced terminals adjacent the upper end of said standard and within the confines of the lower end of said sleeve, said actuator comprising an elongated member slidably mounted in said sleeve for movement toward and away from said terminals, and means resiliently urging said actuator away from said terminals, and cam means on the portion of said shaft disposed within said sleeve engageable with said actuator to urge the latter into contact with said terminals upon rotation of said shaft.

3. The combination of claim 1 wherein the last mentioned means comprises a weight removably secured to the outermost free end of said vane whereby the normal position of said shaft will be with the outermost free end of said vane disposed lowermost.

References Cited in the file of this patent

UNITED STATES PATENTS

| | | |
|---|---|---|
| 534,631 | Carpenter | Feb. 26, 1895 |
| 1,111,195 | Thayer | Sept. 22, 1914 |
| 2,293,574 | Teach | Aug. 18, 1942 |
| 2,421,768 | Voliazzo | June 10, 1947 |

FOREIGN PATENTS

| | | |
|---|---|---|
| 277,357 | Switzerland | Aug. 31, 1951 |
| 1,173,998 | France | Mar. 4, 1959 |